United States Patent
Lilly et al.

(10) Patent No.: US 11,783,077 B2
(45) Date of Patent: Oct. 10, 2023

(54) SYSTEMS AND METHODS FOR PRIVACY-ENHANCING MODIFICATION OF A DATABASE QUERY

(71) Applicant: IMMUTA, INC., College Park, MD (US)

(72) Inventors: Kyle Thomas Lilly, Alexandria, VA (US); Joseph Regensburger, Grove City, OH (US); Alfred V. Rossi, III, Hilliard, OH (US); Mason Sharp, Holmdel, NJ (US)

(73) Assignee: IMMUTA, INC., College Park, MD (US)

( * ) Notice: Subject to any disclaimer, the term of this patent is extended or adjusted under 35 U.S.C. 154(b) by 236 days.

(21) Appl. No.: 17/352,276

(22) Filed: Jun. 19, 2021

(65) Prior Publication Data

US 2021/0397733 A1    Dec. 23, 2021

Related U.S. Application Data

(60) Provisional application No. 63/041,642, filed on Jun. 19, 2020.

(51) Int. Cl.
  *G06F 21/00*    (2013.01)
  *G06F 21/62*    (2013.01)
  *G06F 16/242*   (2019.01)

(52) U.S. Cl.
  CPC ........ *G06F 21/6227* (2013.01); *G06F 16/242* (2019.01)

(58) Field of Classification Search
  None
  See application file for complete search history.

(56) References Cited

U.S. PATENT DOCUMENTS

| | | | |
|---|---|---|---|
| 7,698,250 B2 * | 4/2010 | Dwork | G06F 21/6245 |
| | | | 702/180 |
| 8,291,509 B2 | 10/2012 | Kerschbaum et al. | |
| 8,375,030 B2 * | 2/2013 | Rane | G06F 21/6245 |
| | | | 706/45 |
| 8,661,047 B2 * | 2/2014 | Talwar | G06F 16/245 |
| | | | 707/705 |
| 9,554,203 B1 | 1/2017 | Pavlidi et al. | |
| 9,955,277 B1 | 4/2018 | Alexandridis et al. | |
| 10,467,234 B2 | 11/2019 | Nerurkar et al. | |
| 10,599,867 B2 * | 3/2020 | Bhowmick | H04L 67/535 |
| 10,803,197 B1 * | 10/2020 | Liao | G06F 21/604 |
| 10,922,315 B2 | 2/2021 | Jeong et al. | |
| 11,055,432 B2 | 7/2021 | Hockenbrocht et al. | |

(Continued)

OTHER PUBLICATIONS

Office Action issued in U.S. Appl. No. 16/891,965 dated May 24, 2022, 14 pages.

(Continued)

*Primary Examiner* — Maung T Lwin
(74) *Attorney, Agent, or Firm* — MH2 TECHNOLOGY LAW GROUP, LLP

(57) ABSTRACT

Systems and methods obtain a database query, modify the database query into a modified database query incorporating a privacy mechanism configured for randomizing an attribute value of data in an answer to the modified database query, and output the modified database query. In some embodiments, the modified database query is forwarded to a database.

21 Claims, 6 Drawing Sheets

(56) References Cited

U.S. PATENT DOCUMENTS

| | | |
|---|---|---|
| 11,068,520 B1 | 7/2021 | Neumann et al. |
| 11,163,904 B2 | 11/2021 | Barbas et al. |
| 11,698,990 B2 * | 7/2023 | McFall ................. G06F 21/602 |
| | | 726/26 |
| 2002/0143289 A1 * | 10/2002 | Ellis ...................... A61F 2/2493 |
| | | 606/41 |
| 2007/0288427 A1 | 12/2007 | Ramer et al. |
| 2015/0156578 A1 | 6/2015 | Alexandridis et al. |
| 2015/0286827 A1 * | 10/2015 | Fawaz .................... G06F 21/60 |
| | | 726/26 |
| 2017/0235974 A1 * | 8/2017 | Zhang ................. G06F 16/248 |
| | | 726/26 |
| 2018/0247072 A1 | 8/2018 | Hind |
| 2018/0349384 A1 | 12/2018 | Nerurkar et al. |
| 2019/0026489 A1 | 1/2019 | Nerurkar et al. |
| 2019/0065775 A1 * | 2/2019 | Klucar, Jr. ........ G06F 16/24552 |
| 2019/0138743 A1 | 5/2019 | Nerurkar et al. |
| 2019/0318121 A1 | 10/2019 | Hockenbrocht et al. |
| 2019/0362007 A1 | 11/2019 | Jeong et al. |
| 2020/0074107 A1 | 3/2020 | Barbas et al. |
| 2020/0380159 A1 | 12/2020 | Lilly et al. |
| 2021/0264057 A1 | 8/2021 | Murray et al. |

OTHER PUBLICATIONS

Notice of Allowance issued in U.S. Appl. No. 16/891,965 dated Nov. 2, 2022, 15 pages.

* cited by examiner

SYSTEMS AND METHODS FOR PRIVACY-ENHANCING MODIFICATION OF A DATABASE QUERY

CROSS-REFERENCE TO RELATED APPLICATIONS

This application claims the benefit and filing date of U.S. Provisional Application No. 63/041,642 filed on 19 Jun. 2020, which is hereby incorporated by reference in its entirety.

BACKGROUND

The mass availability of cheap storage combined with an ever-increasing number of internet-connected devices has led to an explosion of data. Since it is often difficult to glean insight from data in the raw, it is a common practice to first load the data into some kind of database system where transformation and analysis can be expedited through the use of formal query languages, such as ANSI SQL.

At the same time, such datasets frequently contain elements which pertain to individuals. Such elements may be identifying or sensitive in nature, presenting privacy concerns.

In response to these concerns, personal or sensitive data can be simply removed, redacted, or held back from the database or organizational data sources. But depending on the data, this may render the dataset less suitable, or even unusable, for various purposes that are valuable to the organization and/or to society. In other words, removing or redacting data can reduce the analytic value of a dataset.

A more delicate approach involves controlled modification of data, reducing a recipient's ability to confidently rely upon field-level data, and thereby granting deniability of record content to data subjects while still retaining enough analytic utility to be suitable for its intended use.

Though useful, application of such methods, known as privacy mechanisms, come with a number of problems: They are typically burdensome to apply by hand, and can be tricky to tune without specialized knowledge of mathematical privacy. Workflow issues also often pose a practical challenge. For instance, data duplication frequently occurs as data is downloaded, transformed, and then moved back to a database for further processing. Moreover, the duplication problem amplified many times over as different choices of mechanisms and/or their parameters are made to fit different use-cases of the same source data.

Approaches to address these issues could include development of a new kind of database system which is capable of applying such policy, or a database front-end to apply the policy correctly on behalf of a user by post-processing the results. However, neither of these solutions are ideal. A database front-end applying policy does so only as the data leaves the database, which makes subsequent manipulation burdensome, and performance can become an issue since data cannot be protected where it is housed. In some cases, the front-end may even be required to fetch a large amount of data from the database in order to fully implement the policy. On the other hand, introducing a new database system to solve this problem would indeed make manipulation less cumbersome, however it still may result in duplication from the system of record and can be difficult to retrofit legacy processes which may then require migration to a new database technology. In addition, the requirement for a custom database system that can modify results according to privacy policies increases costs by precluding the use of a commercial, off-the-shelf database systems.

Some current data-storage-and-retrieval systems utilize privacy policies in association with a database by having the database subsystem apply the privacy policies to database query results. For example, to mask certain values, conventional approaches to retrofit existing database systems to apply privacy policy generally either pass on the query unmodified and post process the results or perform some equivalent limited modification of the query. In either case the scope of implementable privacy policies is limited only to those achievable by superficial modification of the final results. Such approaches, while useful in many contexts, generally offer far less fine-grained control and often much lower quality results when compared to what is achievable with more control over evaluation. Further, an approach embedding the privacy mechanism such as in the disclosed embodiments in this application are not only more secure, as only privacy-protected data ever leaves the database, but make it easier to guarantee consistency. As such, the invention provides improvement upon not only existing database technology by providing a way to retrofit these systems to support privacy policy, but on governance and privacy front-ends which provide privacy through superficial results modification.

Thus, it is desirable to provide systems and methods that enable an organization to maintain a database and balance safeguards to personal privacy without manual application by a specialist, new database systems, or additional copies.

BRIEF SUMMARY

Embodiments described herein modify a database query to incorporate one or more privacy mechanisms in a modified database query for attribute randomization in an answer to the modified query. Such incorporation incorporates the privacy mechanism(s) into the query so that, when the modified query is executed by a database, the results are subject to the privacy mechanism(s). This approach enables the application of the privacy mechanisms even by database systems which have no privacy-centric features.

Embodiments consistent with the subject of this patent application comprise systems and processes which modify a database query ("input query") to incorporate one or more privacy mechanisms for randomizing attribute values in an answer to the modified query, and output the modified query ("modified query") consumable by one or more existing database systems. In some embodiments, the resulting modified query is such that execution of the "modified query" by the existing database system produces results consistent with the execution of an "input query" against the existing database system as if the chosen privacy mechanisms had been pre-applied to source data in the existing database system. In some embodiments, the modified database query is forwarded to a database. In some embodiments, the systems and processes take as input a database query, (which in some embodiments may be written in SQL), together with the schema and privacy mechanism configuration parameters for the privacy mechanisms including, but not limited to identifiers indicating target attributes for randomization, information theoretic-measures of privacy, information-theoretic measures of utility replacement rates, standard deviations, variances, seeds, salts, tweaks and/or other kinds of parameters relevant for pseudorandom generators, and/or other statistical parameters, and outputs a modified database query which is configured to evaluate to the result of the input database query as modified using the privacy mechanism.

Various embodiments include a system that can include a computer-readable data storage device containing program instructions and an associated processor that executes the instructions to perform a process or set of operations. The operations can include obtaining a database query, modifying, using the privacy mechanism, the database query into a modified database query, the modified database query configured for randomizing attribute values of data in an answer to the modified database query, and outputting the modified database query. In some embodiments, the modified database query is forwarded to a database.

DETAILED DESCRIPTION

Figure 1:
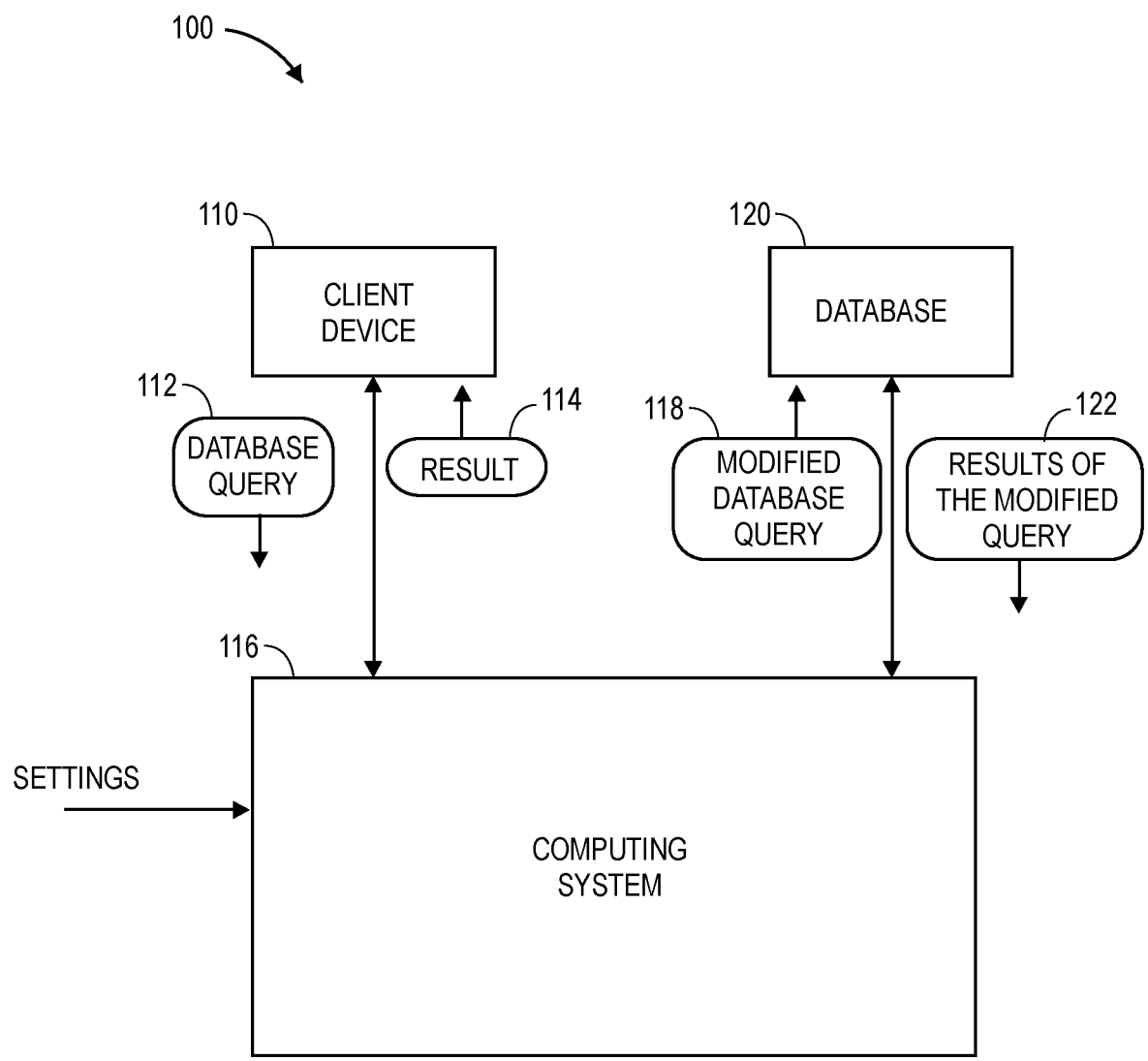
FIG. 1 illustrates a block diagram of an example of an environment for implementing systems and methods in accordance with aspects of the present disclosure.

Embodiments described herein modify a database query to incorporate one or more privacy mechanisms for attribute randomization in an answer to the modified database query.

In a relational database, a relation (or sometimes herein a table) is a set of finite-length tuples of values known as records (or rows) where each attribute (or column) takes values in some set of possible values for the attribute known as a domain.

One way to protect privacy in databases is to utilize a privacy mechanism.

The choice of privacy mechanism varies by use-case, but generally the goal is to provide a relatively useful and/or accurate response to the query for the use-case while limiting the ability of an outsider to infer sensitive personal information from the query results, or to satisfy other privacy objectives.

Privacy mechanisms can obscure data in various ways to, for example, produce the effect of reducing the precision of data (e.g., representing data such as date-of-birth as year-of-birth or generalizing zip code to state), removing sensitive data elements (e.g., removing social security numbers), or randomizing certain data elements, such as measurements, among other things.

In embodiments described herein, a database query is modified to incorporate a privacy mechanism before providing the query to the database. The modified query incorporates both the original query and the privacy mechanism so as to induce a database to give a respond as if the original query was carried out over data which has the desired privacy mechanisms applied.

Differential privacy is a family of mathematical techniques that formally limit the amount of private information that can be inferred about each data subject, and hence are desirable properties of privacy mechanisms. There are two main types of differential privacy, offering slightly different privacy guarantees: "global," which offers data subjects deniability of participation (and/or lack thereof), and "local," which offers deniability of record content. Despite being slightly different formal models of privacy, both operate by introducing randomization into computations on data to prevent an attacker from reasoning about its subjects with certainty. Ultimately, these techniques afford data subjects deniability while still allowing analysts to learn from the data.

Local differential privacy is of particular relevance as some embodiments incorporate privacy mechanisms which satisfy this property. Consider an attacker who wishes to make inferences regarding the private or sensitive information of a data subject. If such data is simply present in a database table or in a query result, the adversary will learn the sensitive value with absolute certainty.

Alternatively, consider a process that randomizes the values instead of returning them in the clear. Such a process could flip a biased coin, returning the value as is whenever the flip comes up as heads. On the other hand, if it is tails, the actual data value is replaced with another value at random or is perhaps otherwise obscured. In either case, the adversary cannot know the outcome of the coin flip, only the final resulting value. Such a process has the obvious benefit that an adversary is unable to be certain about the truth or accuracy of the observed values. This affords data subject deniability because what is observed could be due to the effect of the randomizer instead of being the true content of the subject's record. Moreover, since the randomizer behavior in the above example follows a well-defined noise model, it can often be corrected for. Allowing, for example, fairly accurate count operations over randomized values.

In the language of formal mathematics, we may model a local privacy mechanism M as a (possibly) randomized algorithm which takes, as input, an attribute value from the attribute's domain and returns a replacement value selected from some set of possible outputs. Formally, a privacy mechanism M is said to have the property of $\varepsilon$-local differential privacy (or is $\varepsilon$-LDP) if, for any subset S of possible outputs of M, and any pair of inputs, $x_1$, $x_2$, it holds that $\Pr[M(x_1) \in S] \leq e^\varepsilon \cdot \Pr[M(x_2) \in S]$.

In other words, roughly speaking, when $\varepsilon$ is small, the definition of $\varepsilon$-local differential privacy ensures that there does not exist a good set of output values that can be used as a "distinguishing event" to discriminate between any pair of possible inputs.

It follows from the definition of $\varepsilon$-local differential privacy that an adversary's ability to make sensitive inferences is limited. In particular, when $\varepsilon$ is small, $\varepsilon$-local differential privacy guarantees that an adversary's ability to guess is only marginally improved when additionally taking into account information protected by $\varepsilon$-local differential privacy.

To see why mathematically, one can model such an adversary as a Bayesian process which encodes its beliefs as a probability distribution. Let M be a privacy mechanism satisfying $\varepsilon$-local differential privacy, taking input from a domain D. Suppose that $x_0$ represents the true value of an attribute for some record. Instead of observing $x_0$, the adversary observes the result of having applied the privacy mechanism to $x_0$, denoted $M(x_0)$, while $x_0$ remains unobserved. The goal of the adversary then is to guess the true input value, $x_0$ from the observed value of $M(x_0)$. Let $h_x$ denote the hypothesis $x_0=x$. Let $H=\{h_x:x\in D\}$ denote the set of all possible hypotheses and let $\rho$ denote the adversary's prior over H. By Bayes' theorem, it follows that:

$$Pr[h_x|M(x_0)\in S]=\rho(x)\cdot Pr[M(x)\in S|h_x]/\Sigma_{x_1}(Pr[M(x_1)\in S|h_{x_1}]\cdot\rho(x_1)).$$

For any $x\in D$, by $\varepsilon$-local differential privacy, and the fact that the prior has unit probability mass, it follows that:

$$e^{-\varepsilon}\cdot Pr[M(x)\in S[h_x]] \leq \sum_{x_1}(Pr[M(x_1)\in S[h_{x_1}]]\cdot\rho(x_1)) \leq e^{\varepsilon}\cdot Pr[M(x)\in S[h_x]].$$

Thus, posterior probability is bounded above and below by rescalings of the prior, $e^{-\varepsilon}\cdot\rho(x)\leq Pr[h_x|M(x_0)\in S]\leq e^{\varepsilon}\cdot\rho(x)$. In particular, this forces the posterior to be close to the prior when $\varepsilon$ is small.

Unlike prior systems, various embodiments of the systems and methods described herein technically improve upon prior systems by modifying the query before it reaches the database. Thus, the database systems do not require any modifications and will produce a response to the modified query in the same manner as producing a response to a typical, unmodified query. Various embodiments described herein produce a modified query incorporating a privacy mechanism which, in effect, randomizes at least one attribute in the source data. In accordance with various embodiments, by applying the privacy mechanism via query modification, the database and its administrators do not have to be concerned with, or have specialized knowledge regarding, the privacy aspects of the query and its results. Moreover, such modifications can be done quickly and correctly at scale, freeing even suitably skilled individuals from the burden of having to apply privacy requirements to the results from a large number of queries that may be received by the database. Further, the novel systems and methods described herein can be used to augment the capabilities of, for example, off-the-shelf databases which do not offer privacy features directly in product, including enforcement of the use of the privacy mechanism, by providing an exclusive communication device/channel between the OTS database and queriers, such that the OTS database only receives modified queries as described herein.

Furthermore, various embodiments of the systems and methods described herein technically improve upon prior systems by utilizing an adjustable level of privacy in the modified database query. The adjustable level of privacy allows the database or administrators thereof to provide a level of privacy that is used in modifying the database query. The specified level of privacy is accounted for in modifying the query so that query responses have the correct level of privacy. Further, the database and/or administrators thereof do not have to be concerned with how to apply the level of privacy to any (possibly large) number of queries that may be received by the database.

Various embodiments of the systems and methods described herein are configured to function with a query language, such as SQL (Structured Query Language), which is a standard language for accessing and manipulating databases, such as relational databases. Other embodiments may use other query languages and/or databases. SQL became a standard of the American National Standards Institute (ANSI) in 1986, and of the International Organization for Standardization (ISO) in 1987. A SQL query is a query written in SQL that can execute against a RDBMS (Relational Database Management System). Herein, a RDBMSs which can be queried with SQL may be referred to as an SQL database.

FIG. 1 illustrates a block diagram of an example of a system or an environment 100 for implementing systems and methods in accordance with aspects of the present disclosure. The environment 100 may include a client device 110, a computing system 116, and a database system 120 (also called simply database 120), which in some embodiments may be an SQL database.

In one usage example, a user (not shown) may use the client device 110 to send a database query 112 (e.g., a request for data from a database, such as SELECT Sex, AVG (Salary) FROM Salaries GROUP BY Sex) to the computing system 116, which provides the results 114. Computing system 116, in accordance with aspects of the present disclosure, modifies the database query 112 to incorporate a privacy mechanism, which produces a modified database query 118 that incorporates the privacy mechanism. In various embodiments, the modified database query 118 is configured to randomize at least one attribute in the results 122 to the modified query 118, which are produced by the database system 120, as further explained herein.

As shown in the example of FIG. 1, the modified database query 118 is forwarded to or obtained by the database 120. The database 120 conventionally processes and evaluates the modified query 118 against the data in the database, and returns the results (answer) 122 to the computing system 116. The results 122 of the modified query may be forwarded to or obtained by the client device 110 as the result 114. In various embodiments, the computing system 116 may be configured to receive settings that control how the computing system 116 modifies the original database query 112 to generate the modified database query 118, which may include settings for selecting and/or affecting a privacy mechanism (e.g., a privacy algorithm) that may be applied to the database query 112.

In some examples, the computing system 116 is configured to modify the database query 112 to produce a modified database query 118 which incorporates one or more privacy mechanism. In some examples, the functions and/or presence of the computing system 116 may be unknown or transparent to a user operating the client device 110. In some such examples, the computing system 116 may be configured as the receiving address (e.g., IP address) for the database 120 so that database queries 112 are directed to the computing system 116. In other examples, the database 120 may be configured to route some or all incoming database queries that it receives directly (not shown in FIG. 1) to the computing system 116, which applies the privacy mechanism(s) to each database query, and then supplies a modified query 118 to the database 120 for processing and evaluation. In such embodiments (not shown in FIG. 1), the database 120 may return the results of the modified query 122 directly to the querier.

In various embodiments as shown in FIG. 1, the client device 110 can be an input/output device or computing device that is communicatively connected (directly or indirectly) to the computing system 116 via one or more communication channels. In some implementations, the client device 110 can be a terminal of the computing system 116, a laptop computer, or a personal computing device or the like that provides a user interface. For example, the client device 110 may provide a user with a graphic user interface via which the user can send the database query 112 to the computing system 116, and receive results 114. The communication channel can comprise a wired or wireless data link and/or communication networks, such as a data bus, a local area network, a wide area network, or the Internet.

As described previously as a usage example, a user may use the client device 110 to send a database query 112 (e.g., a request for data from the database 120) to the computing system 116. The user can only access or see the resulting requested data after the data has been obscured according to the privacy mechanism in the modified database query 118, which mechanism may be applicable to some of the users of the client device 110, but not to others, which can be specified, for example, in the settings input to the computing device 116, as further explained herein.

In various embodiments, the computing system 116 includes hardware and software that perform the processes, services, operations, and functions described herein. In some embodiments, the computing system 116 can be implemented as a server.

In various embodiments, the database(s) 120 can be any type of information repository that is queryable. In some implementations, the database 120 can be one or more queryable database, which may be columnated or columnar. In some implementations, the database 120 can be or include data structures, such as PYTHON'S PANDAS DATAFRAME™ or R DATAFRAMES™, and/or can be or include data structures for common consumer applications, such as MICROSOFT EXCEL™ worksheets or MICROSOFT ACCESS™ databases, as are known to those of skill in the art. In some embodiments, the database 120 can be an SQL database.

In various implementations, the database 120 can contain Personally Identifiable Information (PII) or other sensitive data. In one use case example, the database 120 can be a collection of information (e.g., a dataset) maintained by a healthcare provider, and can contain medical, personal, and other sensitive information regarding patients, caregivers and insurers. In other use cases, the database 120 can contain human resources data, business data, financial data (e.g., trade or transactional data), insurance data, etc.

While the database 120 is illustrated as being remote from the computing system 116 in the example shown in FIG. 1, it is understood that some or all of the database 120 could be part of or implemented by the computing system 116 and/or maintained by one or more entities different from the entity that provides, operates, or maintains the computing system 116.

One of ordinary skill will recognize that the components, arrangement, and implementation details of the system 100 are examples presented for conciseness and clarity of explanation. Other components, implementation details, and variations may be used, including adding, combining, or subtracting components. For example, there may be two or more databases 120, some or all of which are external to the computing system 116.

Figure 2:
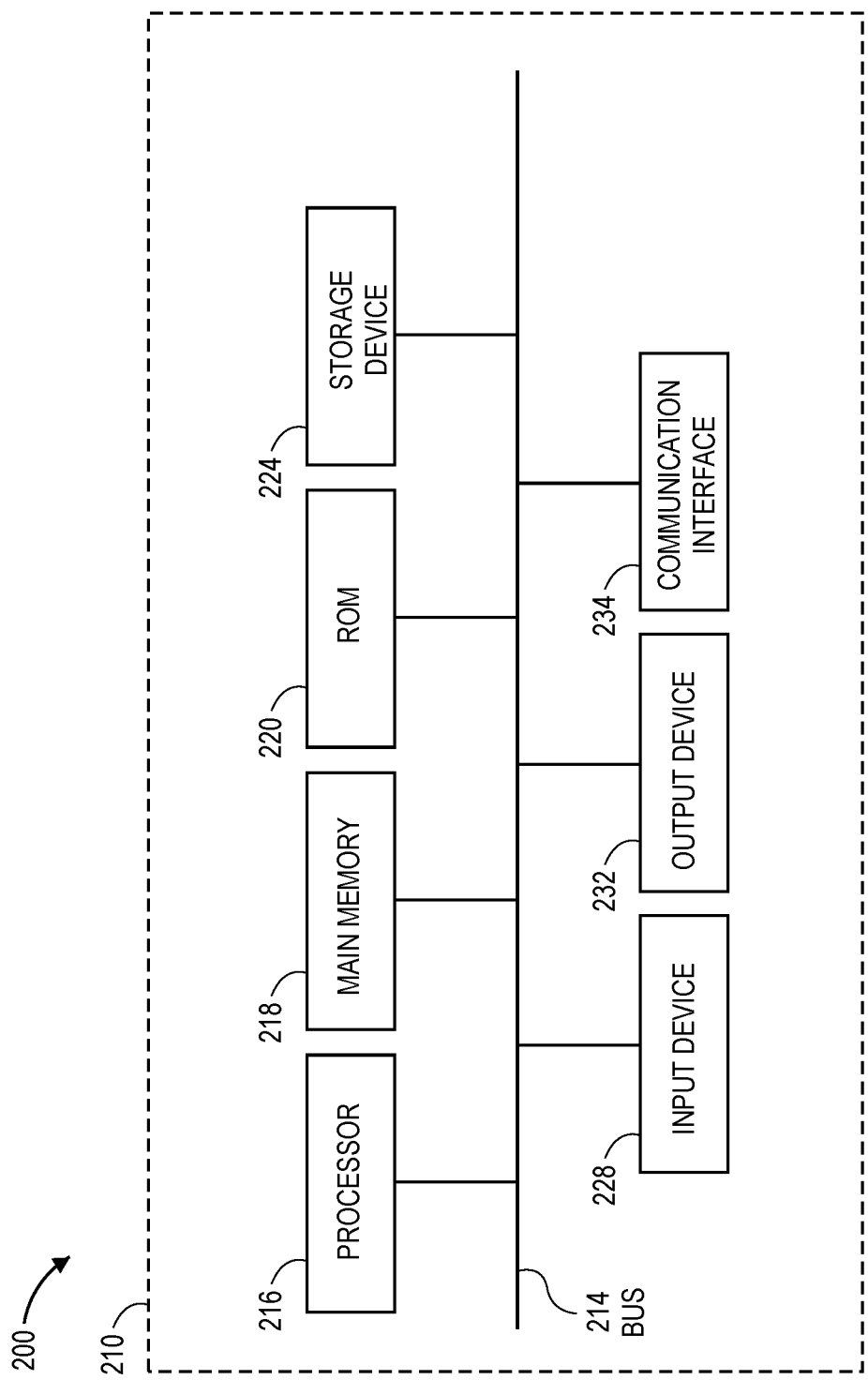
FIG. 2 shows a system block diagram illustrating an example of a computing system, in accordance with aspects of the present disclosure.

FIG. 2 shows a system block diagram illustrating an example of further details of the computing system 116 of FIG. 1, illustrated as computing system 200, in accordance with aspects of the present disclosure. As shown in this example, the computing system 200 includes a computing device 210 capable of communicating via a network, such as the Internet. In example embodiments, the computing device 210 may correspond to a mobile communications device (e.g., a smart phone or a personal digital assistant (PDA)), a portable computer device (e.g., a laptop or a tablet computer), a desktop computing device, a server, etc. In some embodiments, the computing device 210 may host programming and/or an application(s) to carry out the processes, methods, functions, or operations as described herein. For example, the computing device 210 may be configured to receive and/or obtain a database query 112 via its communications interface 234.

The computing device 210 may include a bus 214, a processor 216, a main memory 218, a read only memory (ROM) 220, a storage device 224, an input device 228, an output device 232, and a communication interface 234, as shown in this example.

The bus 214 may be or include a path that permits communication among the components of the computing device 210. The processor 216 may be or include a processor, a microprocessor, an application specific integrated circuit (ASIC), a field programmable gate array (FPGA), or another type of processor that interprets and executes instructions. The main memory 218 may include a random-access memory (RAM) or another type of dynamic storage device that stores information or instructions for execution by the processor 216. The ROM 220 may be or include a static storage device that stores static information or instructions for use by the processor 216. The storage device 224 may include a magnetic storage medium, such as a hard disk drive, or a solid state memory device, which may be removable, such as a flash memory.

The input device 228 may include a component(s) that permits an operator to input information to computing device 210, such as a control button, a keyboard, a keypad, a mouse, a microphone, a touchscreen, or another type of input device. The output device 232 may include a component(s) that outputs information to an operator or user, such as a light emitting diode (LED), a display, a monitor, a touchscreen, or another type of output device. The communication interface 234 may include any transceiver-like component that enables the computing device 210 to communicate with other devices or networks. In some implementations, the communication interface 234 may include a wireless interface, a wired interface, or a combination of a wireless interface and a wired interface. In embodiments, the communication interface 234 may receive computer readable program instructions from a network and may forward the computer readable program instructions for storage in a computer readable storage medium (e.g., storage device 224, main memory 218, etc.).

The system 200 may perform certain operations, as described in detail herein. The system 200 may perform these operations as, or in response to, the processor 216 executing software instructions contained in a computer-readable medium, such as the main memory 218. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into the main memory 218 from another computer-readable medium, such as the storage device 224, or from another device via communication interface 234. The software instructions contained in the main memory 218 may direct the processor 216 to perform the processes, methods, or operations that are described in greater detail herein. Alternatively, hardwired circuitry may be used in place of or in combination with software instructions to implement processes, methods, or operations described herein. Thus, implementations described herein are not limited to any specific combination of hardware circuitry and software.

In some implementations, the system 200 may include additional components, fewer components, different components, or differently arranged components than are shown in FIG. 2.

The system 200 may be connected to a communications network (not shown), which may include one or more wired and/or wireless networks. For example, the communications network may include a cellular network (e.g., a second generation (2G) network, a third generation (3G) network, a fourth generation (4G) network, a fifth generation (2G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the communications network may include copper transmission cables, optical transmission fibers, wireless transmission, routers, firewalls, switches, gateway computers and/or edge servers.

The computing device 210 shown in FIG. 2 may be configured to receive or obtain a database query (e.g. 112) and to modify, using a privacy mechanism, the database query into a modified database query (e.g., 118), among other functions. In some examples, the computing device 210 may be configured to send the modified database query to a database (e.g., 120) and receive the results (e.g., 122) of the modified database query from the database. The computing device 210 may also be configured to provide the modified database query (e.g., 118, 114) to the querier (e.g., a client device 110). In some examples, the modified query is configured for randomizing attribute value(s) of data in the answer or results (e.g., 122) to the modified database query, as further described herein.

One of ordinary skill will recognize that the components, arrangement, and implementation details of the computing system 116, 210 are examples presented for conciseness and clarity of explanation. Other components, implementation details, and variations may be used, including adding, combining, or subtracting components and functions.

Figure 3:
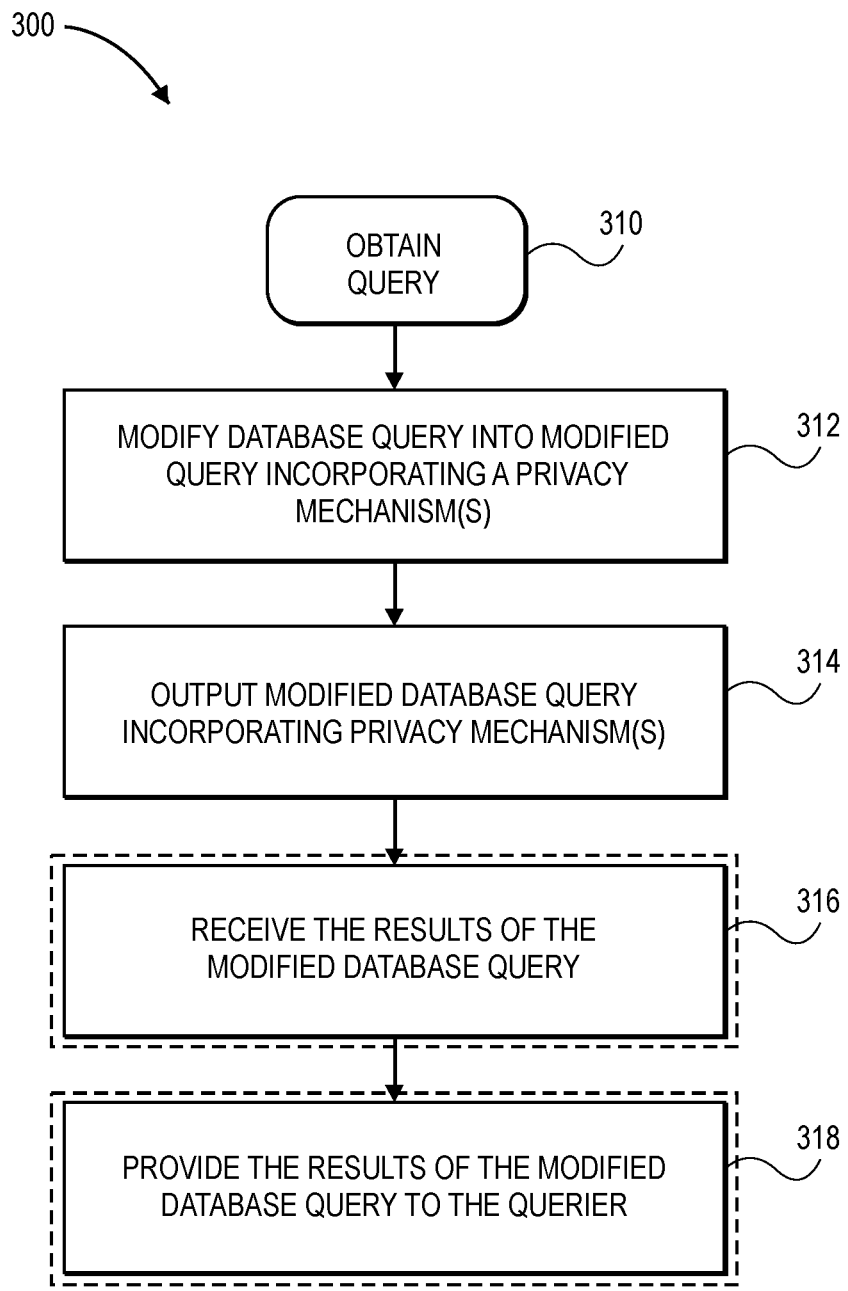
FIG. 3 is a flowchart of an example of a process for modifying, using a privacy mechanism, a database query into a modified query in accordance with aspects of the present disclosure.

FIG. 3 shows an example of a process 300 for modifying a database query into a modified database query incorporating privacy mechanism(s) therein. The blocks that are shown in dashed lines represent operations that are optional in some embodiments. In the example shown, at block 310, the computing system 116, 210 obtains or receives a database query 112. The database query 112 may be obtained or received over the communications interface 234, for example. In some embodiments, the database query 112 may be obtained from a querier, such as the client device 110, that wants to interact with the database 120. In some other embodiments, the database query 112 may be obtained from the database 120, which sends the query 112 to the computing system 116, 210 before processing the query 112, and then later processes the modified query 118 as described herein.

In block 312, the computing system 116, 210 modifies, using the privacy mechanism(s), the received database query 112 into a modified database query 118. Examples of further details of modifying of the database query are further described herein.

In block 314, the modified database query 118 is output or made available by the computing system 116, 210. For example, the computing system 116, 210 may output the modified database query 118 using the communication interface 234. In some examples, the modified database query 118 may be output to the database 120.

In block 316, the process 300, as implemented using the computing system 116, 210, may optionally receive or otherwise obtain the results 122 of the modified query, e.g., from the database 120. In other embodiments, the database 120 may provide the results 122 of the modified query directly to the querier (e.g., to the client device 110), and the computing system 116, 210 may not implement blocks 316 and 318.

And, in block 318, the process 300 may optionally provide the results of the 122 of the modified query to the querier that initiated or sent the query 112. For example, the computing system 116, 210 may provide the results of the 122 of the modified query to the client device 110, in the form of results 114.

One of ordinary skill will recognize that the process 300 of FIG. 3 is presented for conciseness and clarity of explanation, and that blocks and operations may be added to, deleted from, reordered, performed in parallel, or modified within process 300 without departing from the principles of the invention. For example, in the operations represented by blocks 316 and 318 may be omitted. Other variations are possible within the scope of the invention.

Figure 4:
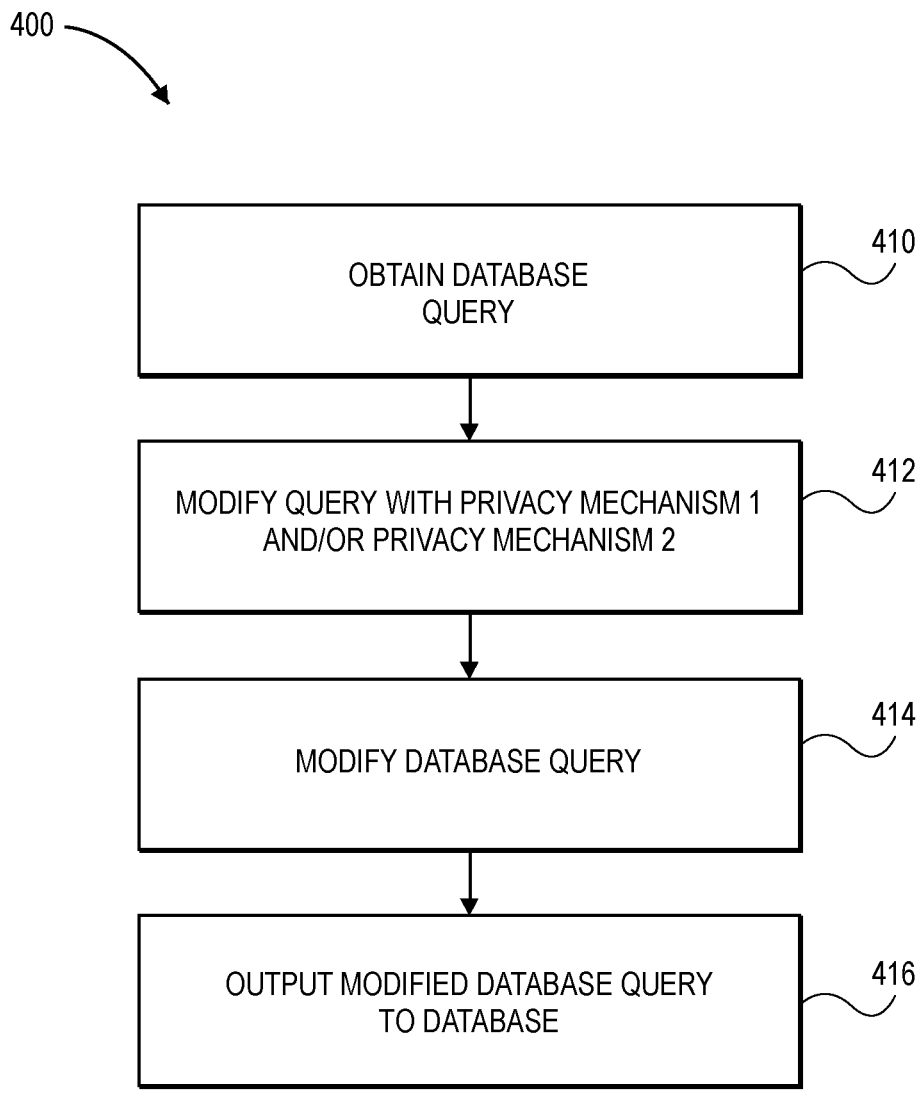
FIG. 4 is a flowchart of an example of a process for modifying a database query in accordance with aspects of the present disclosure.

FIG. 4 shows an example of a process 400 for modifying a database query to create or produce a modified database query that has a privacy mechanism(s) incorporated therein, the modified database query configured for randomizing an attribute value of data in an answer to the modified database query. In the example shown, at block 410, the process 400, e.g., as implemented by the computing system 116, 210, obtains the database query 112. In various embodiments, block 410 may be implemented similarly to, or be equivalent to, block 310 of FIG. 3.

At block 412, the computing system 116, 210 modifies the database query 112 with a first privacy mechanism and/or with a second privacy mechanism (although more than two privacy mechanisms could be used). In some embodiments, the system 116, 210 may determine which privacy mechanism to use based on the type of attribute that the query concerns, as further described herein. In some such embodiments, the privacy mechanism(s) that the system 116, 210 selects to randomize an attribute is determined based on whether the attribute being queried is a categorical attribute, as further described herein. In some embodiments, the processes and systems may utilize a second privacy mechanism when the query concerns non-categorical numeric attributes. In some embodiments, the computing system may determine to use a privacy mechanism with a first attribute and to use a second privacy mechanism with a second attribute.

In embodiments where the database 120 employs a relational database table (relation), the records (rows) in the table are finite-length tuples of values, where each column entry (attribute) has a value in some domain. In some such embodiments described herein, the domain of each column (attribute) may be either: 1) a finite set whose values represent categorical labels (which may be referred to as categorical domain, such as the domain of the attribute "Sex" in the Salaries dataset above, which has the categorical set of labels (M, F)), or 2) an infinite set of numbers (which may be referred to as numerical domains such as the domain of the attribute "Salary" in the Salaries dataset above, which has the set of all positive numbers as possible values). For those embodiments, block 412 may, for example, determine whether to modify the query 112 using the first privacy mechanism 1 or the second privacy mechanism 2 based on whether the attribute being queried has categorical domain or a non-categorical domain, such as a numerical domain.

At block 414, the computing system 116, 210 modifies the database query 112 to incorporate the privacy mechanism (e.g., 1 or 2) that was determined in block 412. This produces or generates a modified database query 118.

At block 416, the computing system 116, 210 outputs or make available the modified database query 118, which incorporates the determined privacy mechanism. In some examples, the modified database query may be output to the database 120 for processing by the database 120.

One of ordinary skill will recognize that the process 400 of FIG. 4 is presented for conciseness and clarity of explanation, and that blocks and operations may be added to, deleted from, reordered, performed in parallel, or modified within process 400 without departing from the principles of the invention. For example, additional blocks, similar to blocks 316 and 318 of FIG. 3, may be added. Other variations are possible within the scope of the invention.

Figure 5:
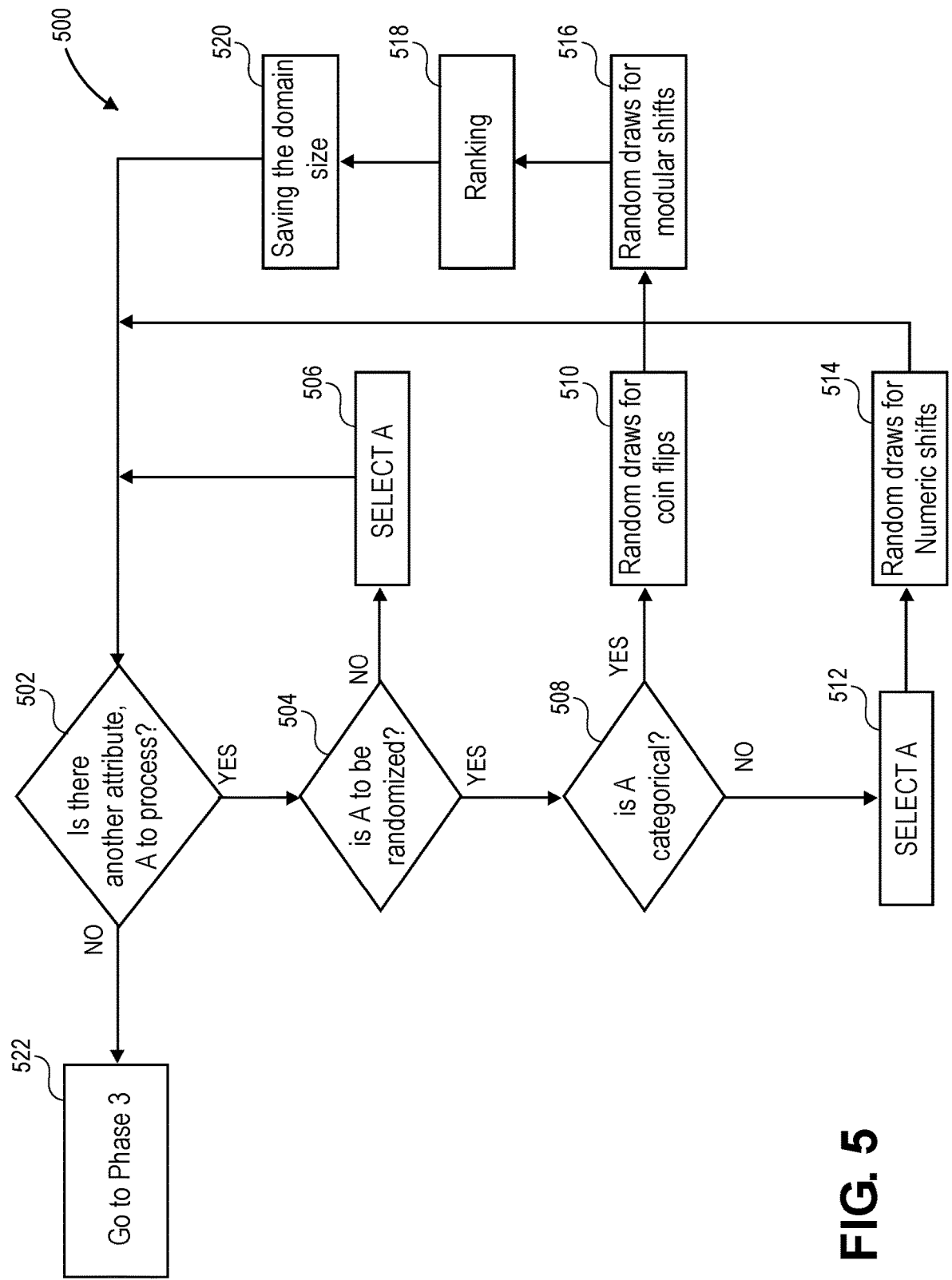
FIG. 5 is a flowchart of an example of a process of modifying a database query in accordance with aspects of the present disclosure.

FIG. 5 shows an example of a process 500 for modifying a database query in accordance with various embodiments. In the start at block 502, the process 500 determines whether there is an attribute "A" referenced in the query (e.g., 112) that has not yet been processed. If yes, in block 504, the process 500 determines whether the attribute A in the query is designated to be randomized. In various embodiments, the indication as to whether or not a particular attribute should be randomized may come from a predetermined configuration, predetermined setting or the like, which for example, can be provided by the owner or administrator of the database 120. In various embodiments, individual attributes may be designated to be randomized or not based on the privacy need and/or sensitivity associated with the data stored in the attribute. For example, the data stored in a "Social Security Number" attribute may be designated for randomization because it highly confidential, which the data stored in an "Occupation" attribute may not be designated for randomization.

If attribute A is not designated to be randomized (504, NO), then at block 506, any remaining attributes A not yet run through process 500 will be selected and then processed in the same manner by looping back to block 502.

If attribute A is designated to be randomized (504, YES), then at block 508, the process 500 determines whether or not attribute A is categorical. If attribute A is not categorical (508, NO), then attribute A is selected in block 512 to be used in block 514. As further explained herein, an attribute is categorical if it applies a label and is not a numeric attribute. In block 514, random draws for numeric shifts concerning attribute A are performed, as further explained herein.

If it is determined that attribute A is categorical (508, YES), then in block 510 random draws for "coin flips" are performed to begin the process of randomizing attribute A, as further described herein. In various embodiments, block 510 computes a random value between 0 and 1, and various techniques or algorithms may be used to generate the random value, some of which are further explained herein.

In block 516, random draws for modular shifts are performed. In various embodiments, this block may generate a random integer to be used in the randomizing of attribute A, and various techniques or algorithms may be used to generate the random integer, some of which are further described herein.

In block 518, ranking is performed, as further described herein. In some embodiments, a ranking query is generated that enumerates items in the categorical domain D over which attribute A takes values.

In block 520, a domain size is saved, as further described herein. In some embodiments, the size of the categorical domain D over which the attribute A takes values needed in a subsequent phase is saved.

Figure 6:
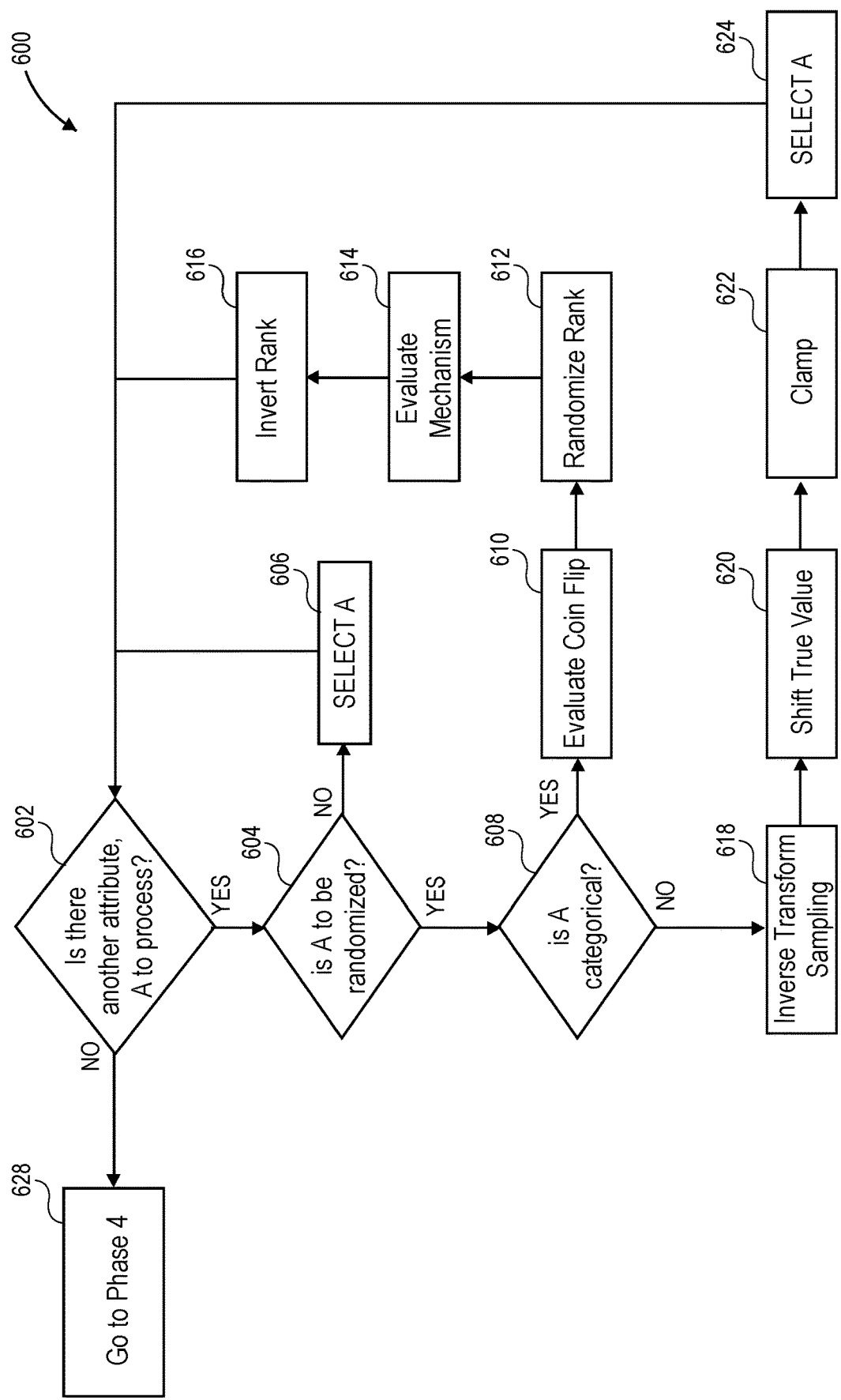
FIG. 6 is a flowchart of an example of a process of modifying a database query in accordance with aspects of the present disclosure.

After the domain size is saved at block 520, the process 500 loops back and determines whether or not there is another attribute to process at block 502. If not (502, NO) then at block 522, the process proceeds to phase 3, which is illustrated in FIG. 6. Further details of these blocks are described below in conjunction with specific examples showing how a query is modified in accordance with embodiments.

FIG. 6 shows an example of a process 600 for modifying a database query in accordance with various embodiments. In a start at block 602, the process 600 determines whether there is an attribute "A" in the query (e.g., 112) that has not yet been processed. If so (602, YES), then in block 604, the process 600 determines whether a current attribute "A" referenced in the query has been designated to be randomized. If attribute A has not been designated to be randomized (604, NO), then the next attribute that has not been processed is selected at block 606 and the process 600 loops back to block 602.

If the process 600 determines that attribute A is categorical (608, YES), then a "coin flip" is evaluated in block 610. In some embodiments, the coin flip may be weighted by a probability p where the coin flip is used for determining whether to release the categorical attribute A without change or to instead substitute attribute A with another value, as further described herein in conjunction with the specific examples. The flip may be by a biased coin which comes up as heads with probability p, and tails with probability (1-p). The value of p allows the level of privacy to be tuned, as further explained herein.

In block 612, a rank is randomized, as further explained herein. An expression is generated randomizing the rankID, $e_{randRankID}$, where D denotes the categorical domain of A. when $|D|=1$, then the randomization has no valid effect and rankID is returned as is. Otherwise, the effect is such that the original rankID is not a possible outcome of the randomization, but any other value appears with uniform probability. In other words, in the case where n>1, the probability of this step returning the same rankID is 0, while the probability of it returning any other value is $1/(n-1)$. Conditional dependence on n can be handled with a case statement that returns the rankID when n<2, and otherwise performs randomization with a modular shift in the range $[1, n-1]$.

In block 614, the mechanism is evaluated, as further explained herein. An expression is generated, $e_{mech}$, evaluating the coin flip. If heads it evaluates to the actual rank, rankID. If tails it evaluates to: $e_{randRankID}$.

In block 616, the rank is inverted, as further explained herein. The query is modified to Q, to join to the rank query $Q_{rank}(A)$, described in the Phase 2 on the rank value produced by evaluating the mechanism $e_{mech}$, selecting the corresponding value in the categorical domain D as A. In effect, this replaces the randomized values for rankID with its corresponding value in D for A as given by $Q_{rank}(A)$.

If the attribute A is not categorical (608, No), then in block 618, an inverse transform sampling is performed, as further described herein. An expression, s, computing a random shift is generated through inverse transform sampling of the 0-centered Laplace distribution, $Lap(x, \sigma/\sqrt{2})$.

In block 620, a true value is shifted, as further described herein. An expression, $x \leftarrow A+s$, is generated. In effect, when evaluated, this applies the random shift to the original value.

In block 622, a clamp is utilized, as further described herein. Optionally, the expression, x, is updated to clamp the value to the column range specified in the configuration.

In block 624, the next attribute A that has not been processed is selected and the process continues back to block 602.

If there is not another attribute to process (602, NO) then at block 628, the process is completed and proceeds to phase 4. Further details of these blocks are described herein in conjunction with specific examples showing how the attributes in an example query are utilized to modify an incoming query into a modified query in accordance with embodiments described herein.

One of ordinary skill will recognize that the processes 500 and 600 of FIGS. 5 and 6 are presented for conciseness and clarity of explanation, and that blocks and operations may be added to, deleted from, reordered, performed in parallel, or modified within these processes without departing from the principles of the invention. Other variations are possible within the scope of the invention.

Description of Privacy Mechanisms

In some example implementations, the systems and processes may utilize a first privacy mechanism $M_1$ when the query concerns categorical data, by randomizing values coming from some domain of possible values, D, by (possibly) replacing one or more attribute values with other values from D. Here, D could represent a set of possible categorical values for a database column (attribute) such as responses to multiple choice questions (e.g., question responses such as Yes/No, (D={Y, N}), descriptors related to gender and sexual orientation, job codes, etc.) Furthermore, while this mechanism behaves randomly, in various embodiments it is tunable in the sense that the odds at which it reveals the true value can be specified, which is related to a corresponding value of E, and therefore the achieved level of privacy.

The privacy mechanism $M_1$ takes, as input, the true value x for an attribute and returns a randomized replacement value y, which could possibly be equal to x in the event that the mechanism chooses to reveal this value. The randomized election of a replacement of the attribute is written as $y \leftarrow M_1(x)$ to denote the (random) event that $M_1$ returns $y \in D$ upon input of $x \in D$. The probability with which $M_1$ outputs y when given x is denoted as $r(y|x)$.

In some embodiments, the behavior of the first privacy mechanism $M_1$ is formalized as follows: Fix a probability p such that $0 \leq p \leq 1$. The privacy-mechanism $M_1$ releases the true value with probability p and any other value with probability $(1-p)/(|D|-1)$. More formally, for any value $x \in D$, $r(x|x)=p$, and $r(y|x)=(1-p)/(|D|-1)$, for any $x \in D$, $x \neq y$, it can be shown that $M_1$ achieves $\varepsilon$-LDP for $\varepsilon=\ln((1/p-1)\cdot(|D|-1))$, and therefore offers information-theoretic guarantees in mitigating inference attacks. Thus, the probability p can be adjusted to control how often the true value will be replaced. This allows customization of the first privacy mechanism $M_1$ to adjust the probability p. In various embodiments, the value of probability p can be set for all attributes or on an attribute-by-attribute basis, for example, via the settings of the computing system 116.

Where x denotes a value of an attribute in the database, algorithmically, the privacy mechanism $M_1$ can be implemented as follows to choose a replacement value y:
1. Flip a biased coin which comes up as heads with probability p, and tails with probability $(1-p)$.
2. If the coin flip comes up heads, return x as y.
3. Otherwise, the coin flip has come up as tails, return as y a value selected uniformly at random from among all values in D excluding x. That is, from D−{x}.

The coin flip can be accomplished using a random number generator, or by any other method.

In some embodiments, the processes and systems may utilize a second privacy mechanism, $M_2$, when the query concerns non-categorical numeric attributes. The second privacy mechanism achieves randomization of numeric attributes and timestamps via inverse transform sampling, as shown in FIG. 6. Its domain is a (possibly bounded) subset of the real numbers, R. As with the first privacy mechanism $M_1$, $y \leftarrow M_2(x)$ denotes the (random) event that the second privacy mechanism $M_2$ returns attribute value $y \in R$ upon input of attribute value $x \in R$. This embodiment may utilize a 0-centered probability distribution with scale parameter b, and an inverse cumulative distribution function, $F_b^{-1}(x)$. The privacy mechanism $M_2$ proceeds by sampling a value u uniformly from [0, 1], and maps attribute value x to $x+F_b^{-1}(u)$, which is shown as shifting of the true value in block 620 of FIG. 6.

For example, when the probability distribution is the Laplace distribution with standard deviation $\sigma$, the corresponding relative likelihood of the event is given by $$r(y|x) = \frac{1}{2b}\exp\left(-\frac{1}{b}|x-y|\right).$$

Moreover, when R is bounded below by $m_0$ and above by $m_1$, then it follows that by taking $b=(m_1-m_0)/\varepsilon$, that the privacy mechanism $M_2$ is $\varepsilon$-LDP and therefore offers information-theoretic guarantees in mitigating inference attacks. In various embodiments, the probability distribution is the Laplace distribution with scale parameter $b=\sigma/\sqrt{2}$.

The second privacy mechanism utilizes attribute A denoted as a timestamp or numeric attribute. Algorithmically, the protocol for releasing A with value x is as follows:
1. If the attribute A is a timestamp attribute, the value is converted into a continuous numeric quantity in some units. For example, UNIX Epoch time with a interpreted with respect to those units.
2. Draw a value, y, from the Laplace distribution, with mean, x, and scale parameter $\sigma/\sqrt{2}$, denoted $Lap(x, \sigma/\sqrt{2})$.
3. Return y, converting back to a timestamp format if A is a timestamp attribute.

Description of Query Modification by Privacy Mechanisms

In various implementations, the systems and processes may modify an incoming query (e.g., 112) into a modified query using a privacy mechanism, where the modified query is configured to randomize at least one attribute in an answer to (the results 122 of) the query generated by a database (e.g., 120).

In various embodiments, given a configuration, C, and a target table T from a database, various embodiments generate a subquery (modified), $Q_{rr}:=Q_{rr}(T,C)$, which is structurally equivalent to T, but with randomization applied. The embodiments then modify the original query, replacing ranges referencing the table T with the subquery $Q_{rr}$.

In various embodiments, the randomization is seeded with respect to the configuration and record ID's, and the output of $Q_{rr}$ is deterministic. In effect, $Q_{rr}$ provides a consistent "snapshot" of target table T with one or more privacy mechanisms applied as configured in configuration C.

Thus, in various embodiments, a query is modified to replace all direct references to target table T referenced in the original query with the modified query $Q_{rr}$, which is built up over four phases described herein. The following example of a hypothetical table and description thereof illustrates the processes employed:

| id | first_name | last_name | drugs | BMI |
|---|---|---|---|---|
| 1 | John | Smith | Y | 23 |
| 2 | Jane | Doe | N | 20 |
| ... | ... | ... | ... | ... |
| 9999 | Zack | Jacobs | Y | 27 |

The hypothetical table includes attributes (columns) drugs (indicating past recreational drug use), and "BMI", which in this example are designated as sensitive and thus will have randomization applied. Here, the drugs column is categorical, taking values over the domain {Y, N}, and BMI contains numerical data which, for the purposes of this example, will be treated as bounded over the interval 0 to 100.

In some embodiments, in a first phase, a query, $Q_{rr}$ is initialized, as an empty selection over the target table, T.

$Q_{rr}$=SELECT< . . . DEFERRED TO PHASE 2 . . . > FROM T

PHASE2: Bootstrap

In various implementations, a second phase is repeated once for each attribute A in target table T. As noted above, the attributes of the example are id, first_name, last_name, drugs, and BMI.) Let A denote an attribute encountered in a generic step of the iteration. For example, A is the attribute "id" in the first iteration, then A is the attribute "first_name" in the second iteration, etc.

Attribute A is added to the target list on query $Q_{rr}$ for selection. In the example, the first three attributes of the example table are not to be randomized (as determined in blocks 504 in FIG. 5). Since all subsequent steps in the second phase only apply to randomized attributes, each of the first three iterations of the second phase in this example merely add these columns to the selection. Thus, after the first 3 complete iterations, and a fourth partial iteration that has progressed through this step but no subsequent second phase steps, the query $Q_{rr}$ is:

SELECT T.id, T.first_name, T.last_name, T.drugs, < . . . DEFERRED TO FURTHER PHASE 2 STEPS . . . > FROM T.

Neglecting further deferred steps, if executed in its present state, as constructed over the example data, the output of query $Q_{rr}$ resembles the following table:

| id | first_name | last_name | drugs |
|---|---|---|---|
| 1 | John | Smith | Y |
| 2 | Jane | Doe | N |
| ... | ... | ... | ... |
| 999 | Zack | Jacobs | Y |

Next, the processes generate an attribute-specific salt for attribute A, $salt_A$, which will be used to help seed random number generation. With respect to the example, we take $salt_{drugs}$=0xaf18ac, $salt_{BMI}$=0x80e1fa.

If attribute A is a categorical attribute marked for randomization (blocks 508, YES in FIG. 5), in some embodiments the following steps are performed:

1. Random draws for coin flips (block 510 in FIG. 5). In this block, an expression, $e_{unitA}$ is generated, computing a random value in the unit interval [0,1]. This can be accomplished, for example, by generating an expression equivalent to $(hash(salt_A\|T_{id}\|tw_{coin})$ & m/m, where hash (examples of such functions include, but are not limited to, MD5, SHA-1, SHA-2, SHA-3, RIPEMD-160) is a cryptographic hash function with a fixed output size of n-bits, and $m=2^k-1$ for some sufficiently large k≤n, and $tw_{coin}$ is an arbitrary but fixed constant unique to this step. The expression is given a unique name derived from the name of A so that its evaluation may be referenced in a third phase (Phase 3). In the example, k=64, and so $m=2^{64}-1$=18446744073709551615. Thus, in a hypothetical dialect of SQL, $e_{coinA}$=(SHA256('0xaf18ac'||':'||T.id::VARCHAR||':'||'coin'))::BIT(63)::UBIGINT)/ 18446744073709551615).

A hypothetical dialect of SQL may be utilized. The steps are implementable, with slight adjustments, against many common SQL dialects. In the hypothetical dialect, an expression expr, can be cast to a type, type, using the syntax expr::type as supported by Postgres. Further, the existence of an unsigned big integer type, UBIGINT may be utilized. The effect of expr::BIT (63)::UBIGINT is to truncate the hash output to a bit vector containing 63 bits of the output (consistent with bitwise and by m (&m)), and to subsequently reinterpret this as the (unsigned) integer corresponding to these bits.

Picking "COIN_T_drugs" as the name for this expression, $Q_{rr}$ is now:

SELECT T.id, T.first_name, T.last_name, T.drugs, <$e_{coinA}$> AS "_COIN_T_drugs"< . . . DEFERRED TO FURTHER PHASE 2 STEPS . . . > FROM T.

Neglecting further deferred steps, if executed in its present state, as constructed over example data, the output of query $Q_{rr}$ resembles the following table:

| id | first_name | last_name | drugs | _COIN_T_drugs |
|---|---|---|---|---|
| 1 | John | Smith | Y | 0.11397436 |
| 2 | Jane | Doe | N | 0.72242265 |
| ... | ... | ... | ... | ... |
| 999 | Zack | Jacobs | Y | 0.27749246 |

2. Random draws for modular shifts (block 516 in FIG. 5). An expression is generated computing a random integer. This can be accomplished, for example, by generating an expression equivalent to $(hash(salt_A\|T_{id}\|tw_{shift})$ & m, where hash is a cryptographic hash function with a fixed output size of n-bits, $m=2^k-1$ for some sufficiently large k≤n, and $tw_{shift}$ is an arbitrary but fixed constant unique to this step. Again, in the example, k=64, and so $m=2^{64}-1=18446744073709551615$. Thus, in our SQL dialect, $e_{shiftA}$ is:

(SHA256('0xaf18ac'||':'||T.id::VARCHAR||':'||'shift'))::BIT(63)::UBIGINT).

Picking "SHIFT_T_drugs" as the name for this expression, $Q_{rr}$ is now:

SELECT T.id, T.first_name, T.last_name, T.drugs, $<e_{coinA}>$ AS "_COIN_T_drugs", $<e_{shiftA}>$ AS "_SHIFT_T_drugs"< . . . DEFERRED TO FURTHER PHASE 2 STEPS . . . > FROM T.

Neglecting further deferred steps, if executed in its present state, as constructed over example data, the output of query $Q_{rr}$ resembles the following table:

| id | first_name | last_name | drugs | _COIN_T_drugs | _SHIFT_T_drugs |
|---|---|---|---|---|---|
| 1 | John | Smith | Y | 0.11397436 | 415716201365382 |
| 2 | Jane | Doe | N | 0.72242265 | 659524784571926 |
| ... | ... | ... | ... | ... | ... |
| 999 | Zack | Jacobs | Y | 0.27749246 | 715709621105918 |

3. Ranking of the categorical value (block 518 in FIG. 5). Generate a ranking query $Q_{rank}(A)$ that enumerates items in the categorical domain D over which A takes values. If categorical domain D is already enumerated in the configuration as $x_1, x_2, \ldots, x_n$, this can be converted into a static query as a query union of static select queries. Specifically, $$Q_{rank}(A) := \bigcup_{i=1}^{n} \text{SELECT } (i \text{ AS } rankID, x_i \text{ AS } A).$$

In the example, $Q_{rank}(A)$ is:

(SELECT 1 AS rank_id, 'Y' as drugs) UNION (SELECT 2 AS rank_id, 'N' as drugs)

which, when evaluated, evaluates to the following table:

| rank_id | drugs |
|---|---|
| 1 | Y |
| 2 | N |

Optionally, if attribute A is known to range over the full categorical domain, or if it is otherwise desired, $Q_{rank}(A)$ can be constructed by utilizing the RANK window function to rank over

SELECT DISTINCT A FROM T ORDER BY A.

The net result is a table similar to the preceding one, except built from the data in the database. Note that there may be a different correspondence between rankIDs and values.

4. Modify $Q_{rr}$ to join to the rank query $Q_{rank}(A)$ on the value of A (block 518 in FIG. 5), selecting the rankID, and assigning the joined query back into $Q_{rr}$. In effect, this provides an alternate numeric representation of the values of A given by the value's corresponding rankID in $Q_{rank}(A)$. In the example, $Q_{rr}$ is now:

SELECT T.id, T.first_name, T.last_name, T.drugs, $<e_{coinA}>$ AS "_COIN_T_drugs", q_rank_drugs.rank_id AS "_RANK_T_drugs"< . . . DEFERRED TO FURTHER PHASE 2 STEPS . . . > FROM T JOIN ($<Q_{rank}(A)>$) AS q_rank_drugs ON T.drugs=q_rank_drugs.drugs.

Neglecting further deferred steps, if executed in its present state, as constructed over example data, the output of query $Q_{rr}$ resembles the following table:

| id | ... | drugs | _COIN_T_drugs | _SHIFT_T_drugs | _RANK_T_drugs |
|---|---|---|---|---|---|
| 1 | . | Y | 0.11397436 | 415716201365382 | 1 |
| 2 | . | N | 0.72242265 | 659524784571926 | 2 |
| ... | . | ... | ... | ... | ... |
| 999 | . | Y | 0.27749246 | 715709621105918 | 1 |

5. Saving the categorical domain size (step 520 in FIG. 5). The size of the categorical domain D over which the attribute A takes values needed in a subsequent phase is saved. If D is already enumerated in the configuration, meaning the translator already knows all potential values for D, $Q_{rr}$ is modified to SELECT this value. In terms of the example, that is, SELECT T.id, < . . . >, 2 AS "_NUM_T_drugs", < . . . DEFERRED TO FURTHER PHASE 2 STEPS . . . > FROM T JOIN < . . . >.

Here, regions marked with "< . . . >" have been elided for brevity. Otherwise, a scalar subquery counting the distinct values of A may be used instead. In which case, SELECT T.id, < . . . >, (SELECT COUNT (DISTINCT T.drugs)) AS "_NUM_T_drugs", < . . . DEFERRED TO FURTHER PHASE 2 STEPS . . . > FROM T JOIN < . . . >.

Neglecting further deferred steps, if executed in its present state, as constructed over example data, the output of query $Q_{rr}$ resembles the following table:

| id | ... | drugs | _COIN_T_drugs | _SHIFT_T_drugs | _RANK_T_drugs | _NUM_T_drugs |
|---|---|---|---|---|---|---|
| 1 | . | Y | 0.11397436 | 415716201365382 | 1 | 2 |
| 2 | . | N | 0.72242265 | 659524784571926 | 2 | 2 |
| ... | . | ... | ... | ... | ... | ... |
| 999 | . | Y | 0.27749246 | 715709621105918 | 1 | 2 |

If attribute A is a numerical attribute marked for randomization, in some embodiments the following are performed:

Random draws for inverse transform sampling (block 618 in FIG. 6). The shifts proper can be generated via inverse transform sampling in a subsequent phase. Various embodiments generate an expression that computes a random value in the unit interval [0,1]. This can be accomplished, for example, as is done in "Random draws for coin flips" (block 610), except that $tw_{coin}$ is replaced with $tw_{its}$, an arbitrary but fixed constant unique to this step. In the worked example, $e_{unitA}$ is:
(SHA256('0x80e1fa'||':'||T.id::
  VARCHAR||':'||'unit'))::BIT(63)::UBIGINT)/
  18446744073709551615)

Thus, $Q_{rr}$ is:
SELECT T.id, < . . . >, <$e_{unitA}$> AS "_UNIT_T_BMI"
  FROM T JOIN < . . . >.

Neglecting further deferred steps, if executed in its present state, as constructed over example data, the output of query $Q_{rr}$ resembles the following table. Note that all previous columns remain present but are elided for brevity:

| id  | ... | BMI | _UNIT_T_BMI |
|-----|-----|-----|-------------|
| 1   | .   | 23  | 0.26087212  |
| 2   | .   | 20  | 0.09940445  |
| ... | .   | ... | ...         |
| 999 | .   | 27  | 0.60238232  |

In the example, evaluation of $Q_{rr}$ at the end of the second phase yields a table similar to the following. Note that the original table columns first_name, last_name, drugs, BMI remain present in the example output but are elided for brevity:

| Id  | . | _COIN_T_drugs | _SHIFT_T_drugs  | _RANK_T_drugs | _NUM_T_drugs | _UNIT_T_BMI |
|-----|---|---------------|-----------------|---------------|--------------|-------------|
| 1   | . | 0.11397436    | 415716201365382 | 1             | 2            | 0.26087212  |
| 2   | . | 0.72242265    | 659524784571926 | 2             | 2            | 0.09940445  |
| ... | . | ...           | ...             | ...           | ...          | ...         |
| 999 | . | 0.27749246    | 715709621105918 | 1             | 2            | 0.60238232  |

In various embodiments, application of randomization is accomplished by creating a new empty selection over the query $Q_{rr}$, assigning the result of this operation back to $Q_{rr}$. In other words, the result of the second phase which is the initial state of $Q_{rr}$ becomes a subquery or modified query on which we continue to build. In the worked example, $Q_{rr}$ is:

SELECT < . . . DEFERRED TO FURTHER PHASE 3 STEPS . . . > FROM (<PHASE 2 QUERY>) AS Q.

The example of this third phase illustrated in FIG. 6 loops over all attributes in table T. Let A denote an attribute encountered in a generic step of the iteration. In some embodiments, if attribute A is not marked or designated for randomization in block 604, NO, it is added the target list on $Q_{rr}$ for selection in block 606. In effect, this promotes non-randomized attribute values from the second phase (Phase 2) to the third (Phase 3) unmodified. Thus, after the first 3 complete iterations, and a fourth partial iteration that has progressed through this step but no subsequent Phase 3 steps, the modified query is:

SELECT Q.id, Q.first_name, Q.last_name, < . . . DEFERRED TO FURTHER PHASE 3 STEPS . . . > FROM (<PHASE 2 QUERY>) AS Q.

If executed at this point the result contains the first three columns,

| id | first_name | last_name |
|----|------------|-----------|
| 1  | John       | Smith     |
| 2  | Jane       | Doe       |

| id  | first_name | last_name |
|-----|------------|-----------|
| ... | ...        | ...       |
| 999 | Zack       | Jacobs    |

If attribute A is a categorical attribute marked for randomization in block 608, YES, the following steps are performed:
1. Evaluating the coin flip in block 610. Generate an expression, $e_{flipA}$:=$rand_{coin} \leq p$, where p, as specified in the configuration, denotes the probability for releasing the categorical attribute A instead of substitution by another value, and $rand_{coin}$ denotes the attribute containing the random draw for the coin flip performed in "Random draws for coin flips" in block 510 of FIG. 5. (_COIN_T_drugs in the example).
2. Randomizing the rank (block 612 in FIG. 6). An expression is generated randomizing the rankID, $e_{randRankID}$. Let D denote the categorical domain of A. As a special case, when |D|=1, then the randomization has no valid effect and rankID is returned as is. Otherwise, the effect is such that the original rankID is not a possible outcome of the randomization, but any other value appears with uniform probability. In other words, in the case where n>1, the probability of this step returning the same rankID is 0, while the probability of it returning any other value is 1/(n−1). Conditional dependence on n can be handled with a case statement that returns the rankID when n<2, and otherwise performs randomization with a modular shift in the range [1, n−1].

As an example, a correct modular shift can be obtained by evaluating the expression:

mod(rankID+mod(randShift,n−1),n)+1, where n denotes the attribute containing the size of the categorical domain, and randShift denotes the random modular shift, both of which were generated and embedded in the query in Phase 1. In the example, $e_{randRankID}$ is
MOD(Q._RANK_T_drugs+MOD(Q._SHIFT_T_drugs, Q._NUM_T_drugs−1), Q._NUM_T_drugs)+1.

Evaluating the mechanism (block 614 in FIG. 6). An expression is generated, $e_{mech}$, evaluating the coin flip. If heads it evaluates to the actual rank, rankID. If tails it evaluates to:

3. Evaluating the mechanism (block 614 in FIG. 6). An expression is generated, $e_{mech}$, evaluating the coin flip. If heads it evaluates to the actual rank, rankID. If tails it evaluates to: $e_{randRankID}$. For example,
CASE WHEN $e_{flip}$ THEN rankID ELSE $e_{randRankID}$.
Which, in the example, when the release probability is 33%, gives the following expression for $e_{mech}$:
CASE WHEN Q._COIN_T_drugs <=0.33
THEN (Q._RANK_T_drugs)

ELSE (MOD(Q._RANK_T_drugs+MOD (Q._SHIFT_T_drugs, Q._NUM_T_drugs−1), Q._NUM_T_drugs)+1).

4. Invert the rank (block 616 in FIG. 6). Modify Q, to join to the rank query $Q_{rank}(A)$, described in the Phase 2 step on the rank value produced by evaluating the mechanism $e_{mech}$, selecting the corresponding value in the categorical domain D as A. In effect, this replaces the randomized values for rankID with its corresponding value in D for A as given by $Q_{rank}(A)$. The resulting joined query is assigned back into $Q_{rr}$. In the example, the query is as follows. Note that Jane's record now indicates drug use.

SELECT Q.id, Q.first_name, Q.last_name, Q_rank_drugs.drugs AS drugs < . . . DEFERRED TO FURTHER PHASE 3 STEPS . . . > FROM (<PHASE 2 QUERY>) AS Q JOIN ($Q_{rank}$(drugs)>) AS Q_rank_drugs on (Q_rank_drugs.rank_id=<$e_{mech}$>).

| id | first_name | last_name | drugs |
|---|---|---|---|
| 1 | John | Smith | Y |
| 2 | Jane | Doe | Y |
| ... | ... | ... | ... |
| 999 | Zack | Jacobs | Y |

If A is a numerical attribute marked for randomization in block 608, NO, the following steps are performed:

An expression, s, computing a random shift is generated through inverse transform sampling in block 618 of FIG. 6, for example, of the 0-centered Laplace distribution, Lap(x, σ/√2). For example, if the configuration includes an equation of σ=3, s could be 1. SIGN(Q.UNIT_T_BMI−0.5)*LN(1−2*ABS (Q._UNIT_T_BMI−0.5))*2.121
2. An expression, x←A+s, is generated. In effect, when evaluated, this applies the random shift to the original value in block 620. In other words, x is now a random variable distributed according to Lap(x, σ/√2).
3. Optionally, the expression, x, is updated to clamp the value to the column range specified in the configuration in block 622. For instance, if the BMI value of 7.1 received a random shift of −9, the returned value would be 0, instead of −1.9. This can be accomplished by wrapping x with appropriate calls to min and max.
4. The expression, x, is added to the target list of $Q_{rr}$ for selection as A.

SELECT Q.id, Q.first_name, Q.last_name, Q_rank_drugs.drugs AS drugs MAX(0, MIN(100, SIGN(Q._UNIT_T_BMI−0.5)*LN(1−2*ABS (Q._UNIT_T_BMI−0.5))*2.121)) AS BMI FROM (<PHASE 2 QUERY>) AS Q JOIN (<$Q_{rank}$(drugs)>) AS Q_rank_drugs on (Q_rank_drugs.rank_id=<$e_{mech}$>)

If executed in its present state, as constructed over example data, the output of query $Q_{rr}$ resembles the following table:

| id | first_name | last_name | drugs | BMI |
|---|---|---|---|---|
| 1 | John | Smith | Y | 24.3798 |
| 2 | Jane | Doe | Y | 23.4262 |
| ... | ... | ... | ... | ... |
| 999 | Zack | Jacobs | Y | 26.5140 |

In a fourth phase, a remote database planner may sort data-based returns from queries to the database based on the randomizer behavior, say on the outcome of a coin flip. In such a case the order of the results could act as a side channel, enabling an attacker to guess whether the given value had been randomized or not just based on its position in the results. Various embodiments therefore may employ a fourth phase (stage) to make a final rewrite of $Q_{rr}$ to impose a sort, as follows:

$Q_{rr}$←SELECT $Q_{rr}$.* FROM $Q_{rr}$ ORDER BY $Q_{rr}$.id

Lastly, the input query Q is walked replacing all ranges referencing the table T with the subquery (modified query) $Q_{rr}$.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for modifying a database query into a modified database query for randomizing an attribute value, the system comprising:
    a computer-readable data storage device containing program instructions; and
    a processor, operably connected to the computer-readable data storage device, that executes the program instructions to perform operations comprising:
        obtaining the database query, wherein the database query includes a request for an attribute value of an attribute in a database;
        modifying the database query into a modified database query incorporating a privacy mechanism, wherein the modified database query incorporating the privacy mechanism is configured for randomizing the attribute value of data in an answer to the modified database query; and
        outputting the modified database query to the database.

2. The system of claim 1, wherein modifying the database query into a modified database query further comprises using a plurality of privacy mechanisms in modifying the database query.

3. The system of claim 1, wherein a type of privacy mechanism utilized in modifying the database query is determined by whether an attribute referenced by the database query is a categorical attribute or a numerical attribute.

4. The system of claim 1, wherein the privacy mechanism is configured to randomize the attribute value in the answer by either replacing the corresponding attribute value from the database in the answer with another attribute value or retaining the attribute value from the database.

5. The system of claim 4, wherein the privacy mechanism is configured to either replace the corresponding attribute value from the database in the answer with another attribute value or retain the attribute value from the database at a rate based on an adjustable level of privacy.

6. The system of claim 4, wherein the attribute value in the database is replaced with another attribute value selected randomly from the database for the corresponding attribute.

7. The system of claim 1, wherein the privacy mechanism modifies at least one attribute value from the database with randomization applied to the attribute value.

8. A method of modifying a database query into a modified database query comprising:
    obtaining the database query, wherein the database query includes a request for an attribute value of an attribute in a database;

modifying the database query into a modified database query incorporating a privacy mechanism, wherein the modified database query incorporating the privacy mechanism is configured for randomizing the attribute value of data in an answer to the modified database query; and outputting the modified database query to the database.

9. The method of claim 8, wherein modifying the database query into a modified database query further comprises using a plurality of privacy mechanisms in modifying the database query.

10. The method of claim 8, further comprising utilizing a type of privacy mechanism based on whether an attribute referenced by the database query is a categorical attribute or a numerical attribute.

11. The method of claim 8, wherein the privacy mechanism is configured to randomize the attribute value in the answer by either replacing the corresponding attribute value from the database in the answer with another attribute value or retaining the attribute value from the database.

12. The method of claim 11, wherein the privacy mechanism is configured to either replace the corresponding attribute value from the database in the answer to the query with another attribute value or retaining the attribute value from the database at a rate based on an adjustable level of privacy.

13. The method of claim 11, wherein the attribute value in the database is replaced with another attribute value selected randomly from the database for the corresponding attribute.

14. The method of claim 8, wherein the privacy mechanism modifies at least one attribute value from the database with randomization applied to the attribute value.

15. A non-transitory computer-readable medium storing instructions which, when executed by one or more processors of a system, cause the system to perform operations comprising:

obtaining a database query, wherein the database query includes a request for an attribute value of an attribute in a database;

modifying the database query into a modified database query incorporating a privacy mechanism, wherein the modified database query incorporating the privacy mechanism is configured for randomizing the attribute value of data in an answer to the modified database query; and outputting the modified database query to the database.

16. The non-transitory computer-readable medium of claim 15, wherein the instructions further cause the system to perform operations comprising modifying the database query into a modified database query by using a plurality of privacy mechanisms in modifying the database query.

17. The non-transitory computer-readable medium of claim 15, wherein the instructions further cause the system to perform operations comprising selecting a type of privacy mechanism based on whether the attribute referenced by the database query is a categorical attribute or a numerical attribute.

18. The non-transitory computer-readable medium of claim 15, wherein the instructions further cause the system to perform operations comprising randomizing the attribute value in the answer by either replacing the corresponding attribute value from the database in the answer with another attribute value or retaining the attribute value from the database.

19. The non-transitory computer-readable medium of claim 18, wherein the instructions further cause the system to perform operations comprising either replacing the corresponding attribute value from the database in the answer to the query with another attribute value or retaining the attribute value from the database at a rate based on an adjustable level of privacy.

20. The non-transitory computer-readable medium of claim 18, wherein the instructions further cause the system to perform operations comprising replacing the attribute value in the database with another attribute value selected randomly from the database for the corresponding attribute.

21. The non-transitory computer-readable medium of claim 15, wherein the instructions further cause the system to perform operations comprising modifying at least one attribute value from the database with randomization applied to the attribute value.

* * * * *